United States Patent Office 3,345,736
Patented Oct. 10, 1967

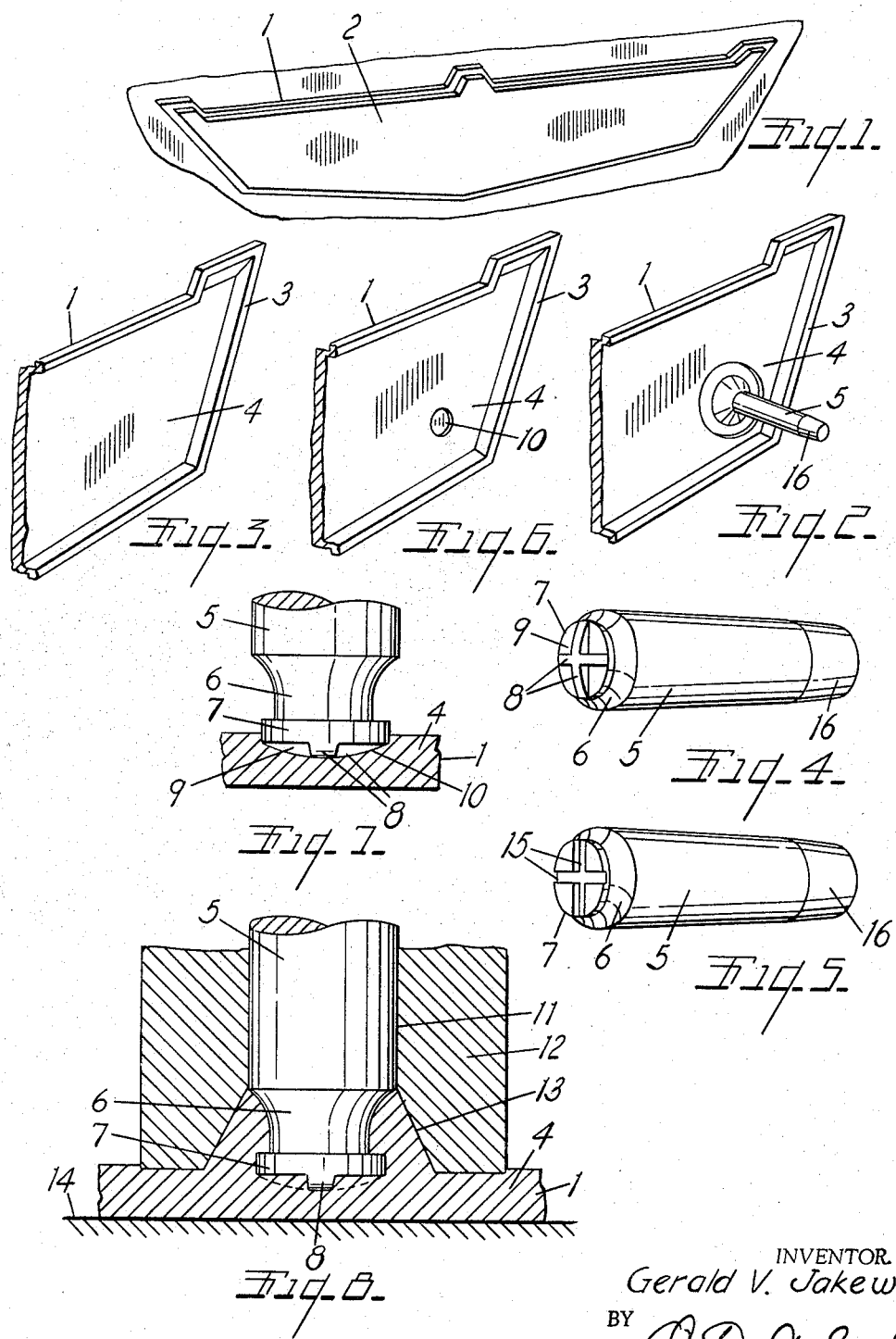

3,345,736
METHOD OF ASSEMBLING A BODY MEMBER AND A STUD TO PRODUCE A UNITARY STRUCTURE
Gerald V. Jakeway, Grand Rapids, Mich., assignor to Keeler Brass Company, Grand Rapids, Mich.
Filed Feb. 24, 1964, Ser. No. 346,842
11 Claims. (Cl. 29—509)

This invention relates to a method of assembling a body member and a stud to produce a unitary structure.

The main objects of this invention are:

First, to provide a method of assembling a body member and a stud which projects laterally from the inner side of the body member and which results in a unitary structure.

Second, to provide a method of producing such a structure in which the body member and stud are connected by a single stroke of a die member.

Third, to provide a method of assembling a body member and stud as hereinbefore indicated in which the outer surface of the body member is not disturbed or disfigured during the assembling of the stud and body member.

Objects relating to the steps of the method are illustrated in the accompanying drawing. The invention is defined and pointed out in the claims.

It should be understood that in the accompanying drawing only a single stud is illustrated but that in general practice the body member is provided with a plurality of studs. However, as the method of assembling is the same for each stud, only a single stud is illustrated.

FIG. 1 is a front view of one form of structure produced by my method as mounted on a support which is conventionally illustrated.

FIG. 2 is a fragmentary rear perspective view of the assembled unit.

FIG. 3 is a rear perspective view corresponding to that of FIG. 2 of the body member as initially formed.

FIG. 4 is a perspective view of one form of stud member.

FIG. 5 is a perspective view of a second form of stud member.

FIG. 6 is a fragmentary perspective view of the body member of FIG. 3 with a recess formed therein to receive the inner end portion of the stud.

FIG. 7 is a fragmentary view illustrating the first step in assembling the body member and stud.

FIG. 8 is an enlarged fragmentary view illustrating the final step in connecting the body member and stud.

In the accompanying drawing 1 represents a plate-like body member having an ornamental portion 2 on the front thereof and having a rearwardly projecting peripheral flange 3. It will be understood that these body members vary greatly in shape. They are formed of aluminum or other material which is moldably conformable, desirably without heating, and they include a portion 4 which is initially of uniform thickness. The stud 5 varies in length but it is of such length as to permit its engagement with some object on which the assembled unit is mounted and as stated while the drawings illustrate only one stud, commonly two or more studs are provided; that depending on the size and shape of the body member. The stud 5 is of relatively nonconformable metal and has an annular recess 6 adjacent its inner end providing a head 7. The face of the head in the embodiment illustrated in FIGS. 2, 7 and 8 is provided with radially disposed ribs 8 forming recesses 9 in the head, the inner edges of the ribs being preferably curved, as is illustrated in FIGS. 4, 7 and 8.

The body member 1 and the studs are formed in desired sizes and the body member is provided with a recess 10 in its inner side dimensioned to fittingly receive a portion of the head of the stud as is illustrated in FIG. 7, the bottom of the recesses being preferably curved to fittingly engage the inner edges of the ribs.

The initial relationship of the stud to the body member is illustrated in FIG. 7. However, in assembling, the stud is fittingly positioned in the bore 11 of the die member 12. This die member 12 has an outwardly tapered conical recess 13 in its inner portion at the inner end of the stud dimensioned so that the wall of the recess surrounds and is radially spaced from the portion of the stud having the annular recess or groove 6 therein and this recess coacts with the groove of the stud to provide an outwardly tapered annular space surrounding the groove portion and head portion of the stud.

After positioning these parts in this assembled relation, the die member is actuated or forced inwardly relative to the body member and a portion of the body member is moldingly upset into the groove and into clamping engagement with the inner end portion of the stud imbedding the head of the stud and the ribs thereon. This results in the stud being fixedly connected to the body member as is illustrated in FIG. 2. With this method, the stud and body members are effectively secured without the necessity for riveting or the like and the assembled structure is in effect unitary and has that appearance.

In the accompanying drawing I illustrate a bed member 14 conventionally. Details of the support member are not illustrated as presses of the commonly or widely used type may be used having bed portions 14 and actuating means for forcing the die member or die members. The body member 1 is desirably of aluminum which is characterized by being moldably conformable without heating and the portions thereof to which the studs are connected are of substantially uniform thickness.

In the embodiment of my invention shown in FIG. 5, radial grooves 15 are formed in the inner end of the head portion of the stud and the metal is forced into these grooves instead of being forced around the ribs as in the embodiment shown in FIGS. 4, 7 and 8. These ribs or grooves prevent any rotative movement of the stud.

The studs illustrated are provided with tapered outer end portions 16 which facilitate some retaining member being sleeved upon the studs. However, I have not illustrated such members as they may be varied or the studs may be forced into an opening in some support member designed to receive the same and dimensioned so that the stud is clutchingly engaged.

As stated, I have illustrated my invention as embodied in an ornamental device and in practice these devices vary greatly in shape. One important feature of the method is that the stud is fixedly secured to the body member and that without any deforming or disfiguring of the face portion of the body member. In commercial practice studs of varying lengths are used but they are formed of relatively nonconformable material as compared to the conformable material of the body member which, commercially, is desirably of aluminum but may be of other moldably conformable material.

I have illustrated an apparatus for forming my invention in a highly practical manner.

Having thus described the invention, what is claimed as new and desired to secure by Letters Patent is:

1. The method of assembling a body member of aluminum which is moldably conformable without heating and having a portion of substantially uniform thickness, and a stud of relatively nonconformable metal having angularly disposed ribs on its inner end having curved inner edges and having an annular groove adjacent to but spaced from its inner end and of such depth as to provide a head portion on the inner end of the stud, the method comprising the steps of forming a recess in the inner side of the body member dimensioned to fittingly receive a portion of said stud head portion, the bottom of the recess being curved to fittingly receive the curved inner edges of said stud ribs, positioning said body member upon a support, positioning the stud in a die member having an opening therein dimensioned to supportedly receive the stud, the die member having an outwardly tapering conical recess at the inner end of its said stud receiving opening dimensioned so that the wall of the recess surrounds and is spaced from the portion of the stud having the annular groove therein and coacts therewith to provide an outwardly tapering annular recess, and actuating said die member inwardly relative to said body member so that a portion of said body member is moldingly upset into said groove and into clamping engagement with the inner end portion of said stud and said ribs on the inner end thereof and so that said body member and stud are fixedly connected.

2. The method of assembling a body member of aluminum which is moldably conformable without heating and having a portion of substantially uniform thickness, and a stud of relatively nonconformable metal having angularly disposed ribs on its inner end and having an annular groove adjacent to but spaced from its inner end and of such depth as to provide a head portion on the inner end of the stud, the method comprising the steps of forming a recess in the inner side of the body member dimensioned to fittingly receive a portion of said stud head portion, positioning said body member upon a support, positioning the stud in a die member having an opening therein dimensioned to supportedly receive the stud, the die member having an outwardly tapering conical recess at the inner end of its said stud receiving opening dimensioned so that the wall of the recess surrounds and is spaced from the portion of the stud having the annular groove therein and coacts therewith to provide an outwardly tapering annular recess, and actuating said die member inwardly relative to said body member so that a portion of said body member is moldingly upset into said groove and into clamping engagement with the inner end portion of said stud and said ribs on the inner end thereof and so that said body member and stud are fixedly connected.

3. The method of assembling a body member of metal which is moldably conformable without heating, and a stud of relatively nonconformable metal having an annular groove adjacent its inner end and of such depth as to provide a head portion on the inner end of the stud, the method comprising the steps of forming a recess in the inner side of the body member dimensioned to receive a portion of said stud head, positioning said body member upon a support, positioning the stud in a die member having an opening therein dimensioned to supportedly receive the stud, the die member having an outwardly tapering conical recess at the inner end of its said stud receiving opening dimensioned so that the wall of the recess surrounds and is spaced from the portion of the stud having the annular groove therein and coacts therewith to provide an outwardly tapering annular recess, and actuating said die member inwardly relative to said body member and moldingly upsetting a portion of said body member into said groove and into clamping embedding engagement with the head portion of said stud, so that said body member and stud are fixedly connected and constitute a unitary structure.

4. The method of assembling a body member of metal which is moldably conformable, and a stud of relatively nonconformable metal having an annular groove adjacent its inner end and of such depth as to provide a head portion on the inner end of the stud, the method comprising the steps of forming a recess in the inner side of the body member dimensioned to receive a portion of said stud head, positioning said body member upon a support, positioning the stud in a die member having an opening therein dimensioned to supportedly receive the stud, the die member having a recess at the inner end of its said stud receiving opening dimensioned so that the wall of the recess surrounds and is spaced from the portion of the stud having the annular groove therein and coacts therewith to provide an annular recess, and actuating said die member inwardly relative to said body member and moldingly upsetting a portion of said body member into clamping embedding engagement with the head portion of said stud, so that said body member and stud are fixedly connected and constitute a unitary structure.

5. The method of assembling a body member of a metal which is moldably conformable when subjected to pressure, and a stud of relatively nonconformable metal having angularly disposed recesses in its inner end and having a peripheral recess adjacent to but spaced from its inner end and of such depth as to provide a head portion on the inner end of the stud, the method comprising the steps of forming a recess in the inner side of the body member dimensioned to supportingly receive a portion of the inner end of said stud, positioning the stud in a die member having an opening therein dimensioned to supportedly receive the stud, the die member having a recess at the inner end of its said stud receiving opening dimensioned so that the wall of the recess surrounds and is spaced from a portion of the stud at the outer side of its said head and coacts therewith to provide an annular recess, and actuating said die member relative to said body member so that portions of said body member are moldingly upset into clamping engagement with the inner end portion of said stud and so that said body member and stud are unitarily connected.

6. The method of assembling a body member of a metal which is moldably conformable when subjected to pressure, and a stud of relatively nonconformable metal having a peripheral recess adjacent to but spaced from its inner end and of such depth as to provide a head portion on the inner end of the stud, the method comprising the steps of forming a recess in the inner side of the body member dimensioned to supportingly receive a portion of the inner end of said stud, positioning the stud in a die member having an opening therein dimensioned to supportedly receive the stud, the die member having a recess at the inner end of its said stud receiving opening dimensioned so that the wall of the recess surrounds and is spaced from a portion of the stud at the outer side of its said head and coacts therewith to provide an annular recess, and actuating said die member relative to said body member so that portions of said body member are moldingly upset into clamping engagement with the inner end portion of said stud and so that said body member and stud are unitarily connected.

7. The method of assembling a body member of metal which is moldably conformable when subjected to pressure without heating, and a stud of relatively non-conformable metal and having a lug on its inner end, the method comprising the steps of forming a cavity in one side of the body member of such size as to receive the inner end of the stud, positioning the stud in a die member having an opening therein dimensioned to receive and guide at least an inner end portion of the stud, the die member having a conical recess at one end of its said stud-receiving opening dimensioned so that the wall of the recess surrounds and is spaced from said inner end portion of the stud and is open to said one side of said body member, and actuating said die member relative to said body member so that a portion of the body member is moldingly upset into embedding engagement with the lug on the inner end of the stud and into surrounding embedding clamping engagement with said inner end portion of the stud.

8. The method of assembling a body member of metal which is moldably conformable without heating when subjected to pressure, and a relatively non-conformable stud and having spaced recesses in its inner end, the method comprising the steps of forming a cavity in one side of the body member dimensioned to receive the inner end of the stud, positioning the stud in a die member having an opening therein dimensioned to laterally support the stud in angular relation to said body member, the die member having a recess at one end of its said stud-receiving opening dimensioned so that the wall of the recess is spaced from the inner end portion of the stud and is open to said one side of said body member, and actuating said die member relative to said body member so that a portion of the body member is moldingly upset into the recesses on the inner end of the stuud and into clamping and supporting engagement with said inner end portion of the stud.

9. The method of assembling a body member of material which is moldably conformable when subjected to pressure, and a stud of relatively non-conformable material and having spaced recesses in its inner end, the method comprising the steps of forming a cavity in one side of the body member dimensioned to receive the inner end of the stud, positioning the stud in a die member having an opening therein dimensioned to receive the stud, the die member having a recess at one end of its said stud-receiving opening dimensioned so that the wall of the recess surrounds and is spaced from an inner end portion of the stud and is open to said one side of said body member, and actuating said die member relative to said body member so that a portion of the body member is moldingly upset into said recesses in the inner end of the stud and into surrounding supporting engagement with said inner end portion of the stud.

10. The method of assembling a body member of a metal which is moldably conformable without heating when subjected to pressure, and a stud of relatively non-conformable metal and having a peripheral recess adjacent to but spaced from its inner end and of such depth as to form a head portion on the inner end of the stud, the method comprising the steps of positioning the stud in a die member having an opening therein which has an outer portion dimensioned to fittingly receive the stud at the outer side of its said recess, the die member having a recess at the inner end of its said stud fitting portion dimensioned and positioned so that the wall of the recess in said die member is spaced from and surrounds the recessed portion of the stud at the outer side of its said head and coacts therewith to provide an annular space surrounding the stud at the outer side of its head portion, and thrustingly actuating said die member relative to said body member to such degree that a portion of said body member is upset into said recess in said stud and into clamping engagement with the inner end of said stud and said body member and stud are thereby unitarily connected.

11. The method of assembling a thin metallic body member which is moldably conformable without heating and having a portion of substantially uniform thickness, and a stud of relatively nonconformable metal having an annular groove adjacent to but spaced from one end, said groove being of such depth as to provide a head portion on the said one end of said stud and having angularly disposed ribs on the face of said head portion, the method comprising the steps of forming a shallow recess in the inner side of the thin body member dimensioned to receive said stud head portion, the bottom of the recess being curved to fittingly receive the angularly disposed ribs on said stud; positioning said body member upon a support; positioning the stud in a die member having an opening therein dimensioned to supportedly receive said stud, the die member having an outwardly tapering conical recess at the inner end of the said stud receiving opening dimensioned so that the wall of the recess is spaced from and surrounds the portion of the stud having the annular groove therein and is coaxial therewith to provide an outwardly tapering annular recess; actuating said die member inwardly relative to said body member so that a portion of said body member is moldingly upset surrounding said ribs on the end of said stud, whereby said stud is prevented from rotating relative to said body member; and further actuating said die member inwardly relative to said body member so that a portion of said body member is moldingly upset into said groove and into clamping engagement with the inner end portion of said stud so that said body member and stud are fixedly connected.

References Cited

UNITED STATES PATENTS

| 44,928 | 11/1864 | Barnard | 29—520 |
| 1,337,001 | 4/1920 | Couve. | |

FOREIGN PATENTS

| 55,836 | 6/1912 | Austria. |
| 693,205 | 11/1930 | France. |

CHARLIE T. MOON, *Primary Examiner.*